United States Patent

Bodlaj

[15] 3,668,547
[45] June 6, 1972

[54] FREQUENCY-STABILIZED LASER ARRANGEMENT

[72] Inventor: Viktor Bodlaj, Munich, Germany

[73] Assignee: Siemens Aktiengesellschaft, Berlin and Munich, Germany

[22] Filed: Mar. 10, 1971

[21] Appl. No.: 122,796

[30] Foreign Application Priority Data

Apr. 1, 1970 Germany..................P 20 15 612.1

[52] U.S. Cl............................................331/94.5, 350/160
[51] Int. Cl..........................................................H01s 3/10
[58] Field of Search.................................331/94.5; 350/160

[56] References Cited

UNITED STATES PATENTS

| | | | |
|---|---|---|---|
| 3,596,201 | 7/1971 | Chester | 331/94.5 |
| 3,594,659 | 7/1971 | Brandli et al. | 331/94.5 |
| 3,534,292 | 10/1970 | Cutler | 331/94.4 |

Primary Examiner—William L. Sikes
Attorney—Hill, Sherman, Meroni, Gross & Simpson

[57] ABSTRACT

A laser arrangement for the stabilization of the frequency of a one or two mode gas laser, particularly a short He–Ne laser, where the stimulated medium is arranged between a fixed mirror and a mirror which is displaceable by means of a piezo-ceramic in the axial direction of the laser, the laser beams discharging from the partially transparent fixed mirror being used to generate a DC voltage control signal which is proportional to the frequency deviation of the laser beams with respect to the central frequency of the amplifying transfer, returning the resonator to the central frequency by way of the piezo-ceramic, in the control circuit which contains a photosensitive element and subsequent amplifiers and phase sensitive demodulators. The stimulated medium is arranged, at least partially, in a magnetic coil which is excited to generate an axis-parallel alternating magnetic field. A λ4 plate and a polarization device are arranged between the fixed partially transparent mirror and the photo-sensitive element.

7 Claims, 4 Drawing Figures

FREQUENCY-STABILIZED LASER ARRANGEMENT

BACKGROUND OF THE INVENTION

1. Field of the Invention

This invention relates to a laser arrangement for stabilizing the frequency of a one or two mode gas laser, particularly a short He–Ne laser, where the stimulated medium is arranged between a fixed mirror and a mirror which is mounted on a piezo-ceramic element and which is displaceable in the axial direction of the laser, wherein the laser beams discharging from the partially transparent fixed mirror are employed to generate a DC voltage control signal which is proportional to the frequency deviation of the laser beams with respect to the central frequency of the amplifying transfer, returning the resonator to the central frequency by way of the piezo-ceramic element, the control circuit containing a photo-sensitive element and subsequent amplifiers and phase demodulator components.

2. Description of the Prior Art

Systems such as those generally described above are already known in the art. See for example, A. D. White et al in Applied Physics Letters, Volume 5, No. 5, 1964, pages 97–98. In such a system, the dichroism of the gas load of the absorption tube, generated by the magnetic field is utilized. This is produced by the Zeeman breakup of the absorption curve into two separate curves, one representing the absorption of a left-circular polarized wave, the other one representing the absorption for a right-circular polarized wave. As soon as the operating frequency $v$ of the laser no longer coincides with the frequency $v_o$ of the maximum of the absorption curve which is not broken up, a debilitation fluctuating at the rhythm of the frequency of the magnetic field in the absorption tube of the laser beam results during passage through the absorption tube, whose amplitude is proportional to a certain deviation of the laser frequency from the central frequency $v_o$ to the amount of the deviation. The amplitude of the AC wave caused by a laser beam so modulated in a photo element, a photo diode for example, can be used as a control signal for the shifting of the laser mirror which is positioned on a piezo-ceramic in order to tune the laser to the central frequency $v_o$.

These arrangements of prior art require a great deal of space due to the separate absorption cells so that the entire stabilized laser arrangement turns out to be a relatively large piece of equipment. Thus, the design becomes both more expensive and more complicated and serious space problems develop in many cases of applications, particularly when used in interfer meters.

SUMMARY OF THE INVENTION

The present invention has as its primary objective, therefore, the provision of a frequency stabilized laser arrangement which is considerably less expensive and makes possible an equally good control quality as the arrangements of the prior art with absorption cells. According to the present invention, the foregoing objective is realized in a laser arrangement of the above-mentioned kind by a construction wherein the stimulated medium is arranged, or at least partially arranged, in a magnetic coil which generates an axis-parallel alternating magnetic field, and a λ/4 plate and a polarization device are arranged between the fixed partially transparent mirror and the photo-sensitive element.

With a small magnetic field (a few Gauss) the laser beams break up into two highly coupled oscillations which extend in opposite directions. The direction of rotation of the individual ones depends on the direction of the axial magnetic field in the laser tube. At a laser frequency $v_L$ which differs from the central frequency $v_o$ of the amplifying laser line the intensity of the right-circular polarized radiation (RZP) of the negative and positive axial magnetic field is of different magnitudes. In an alternating magnetic field, the intensity of the right-circular wave (RZP) depends on the time-wise course of the magnetic field. The time-wise course of the intensity of the right-circular wave (RZP) for a laser frequency $v_L < v_o$ and a laser frequency $v_L > v_o$ differs in phase by $\pi$. The left-circular polarized radiation (LZP) acts in the same manner. This property of the left-circular and right-circular radiation in the alternating magnetic field is utilized as control criteria for the stabilization of the laser frequency, because the position of the laser frequency is given by the degree and phase of the intensity modulation.

In order to avoid the induction of an interference voltage in the laser tube by the alternating magnetic field of the coil, it is contemplated in a further improvement of the invention that the magnetic coil forms the inductance of an electrical oscillation circuit operated by a resonance amplifier.

Because the arrangements according to the present invention and to those operating with an electro-optical polarization switch or an absorption cell permit a control only in the range where the differences in intensity of the circular waves are clearly connected with the deviation of the laser frequency from the central position — which approximately corresponds with the distance of the maxima of both profiles for left and right-circular polarized radiation — it is possible upon turning on the laser that the radiation occurring comes to be located outside the laser in an additional control range, hereinafter called the holding range, so that the control circuit cannot operate. According to another improvement of the invention, it is, therefore, proposed to provide an electric motor which is controlled by a logic circuit which applies, in this case via a potentiometer, a variable DC voltage from an additional source to the piezo-ceramic and varies this voltage until the frequency of the laser resonator corresponds approximately with the central frequency $v_o$. It is preferable that this is accomplished through the aforementioned logic circuit which controls the magnitude of the amplified photo element voltage which is demodulated correctly in phase and starts the motor when a certain magnitude is exceeded, which means that the laser line undergoes a very strong shift. In order to avoid a reciprocal disturbing influence in the normal control circuit and the "search system" operated by the motor, means are provided to disconnect the normal photo element control loop in response to operation of the logic circuit.

It is also an object of this invention to provide a search system to correct the frequency of the laser when the control voltage approaches the limit of the holding range without interrupting the stabilization of the laser. This provides that the laser frequency cannot get out of the holding range of the control loop and/or beyond the admissible error $\Delta$, and accordingly, the steepness of the control loop may be enlarged substantially which makes possible a more precise frequency stabilization.

If, during very long continuous operation of the laser, for example through considerable fluctuations of ambient parameters, the additional control monitored by the motor connected to the potentiometer having moved very close to one of its two stops, a second logic circuit provides for a return of the potentiometer to the central position. This operation which interrupts the synchronization of the laser for a short time is reported externally of the system, preferably by an indication device, for example, a buzzer or an optical reading device controlled by the second logic circuit. However, generally the interruption of the synchronization and the return of the potentiometer need not interfere, even if the laser is operated continuously for days, in that the principal source of interference for such major deviations is eliminated in a laser system according to the invention by a good thermal compensation of the laser. To prevent contradictory voltages at the piezo-ceramic, apparatus controlled by the second logic circuit are provided which block the catching and holding automatically during a return of the potentiometer. The laser is again stabilized automatically after the return of the potentiometer.

A control system according to the invention is also appropriate for frequency stabilization of the laser if two inherent frequencies occur during the search operation. In this case the oscillation which is stronger in intensity is trapped first and shifted in the direction of the central frequency $v_o$, whereby the second possible form of oscillation is also shifted, so that it drops out of the profile of the laser line and can, therefore, no longer be amplified.

BRIEF DESCRIPTION OF THE DRAWINGS

Many other objects, features and advantages of the invention, its organization, construction and operation, will be best understood from the following detailed description taken in conjunction with the accompanying drawings, in which.

DESCRIPTION OF THE PREFERRED EMBODIMENTS

Figure 1A:
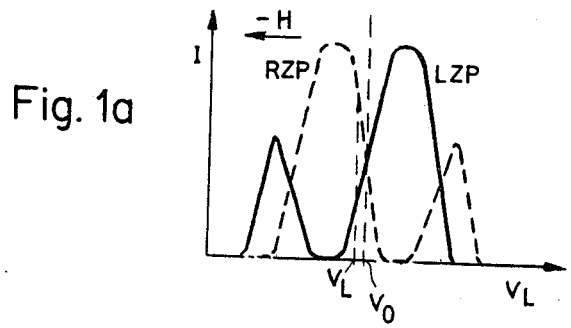
FIG. 1 is a graphical illustration of the intensity for right-circular polarized and left-circular polarized radiation of a gas laser as a function of the laser frequency $v_L$ for the different directions of magnetic field illustrated in FIG. 1a and FIG. 1b.
Figure 1B:
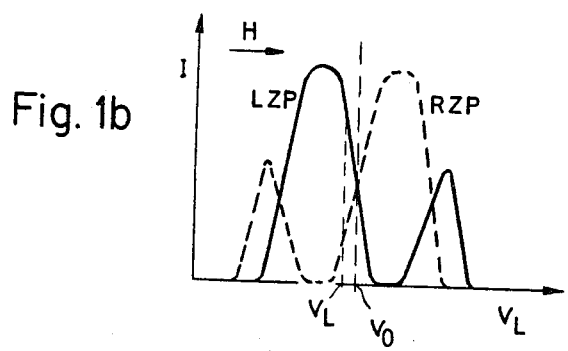
Figure 2:
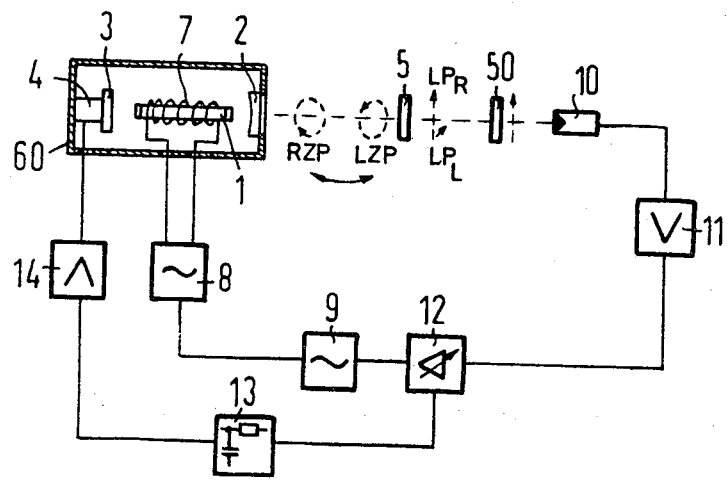
FIG. 2 is a schematic representation of a simple stabilized laser arrangement according to the present invention without the provision of the additional automatic search apparatus.

Referring to FIG. 2, a laser tube 1 filled with, for example, a He–Ne mixture is arranged between a solid partially transparent mirror 2 and a mirror 3 which is secured to a piezo-ceramic body 4. The laser provides two circular-polarized laser beams RZP and LZP which are converted with a λ/4 plate 5 into two linear polarized intensity modulated waves disposed perpendicularly to one another. During the screening of one of the two linear polarized laser waves, for example, of the wave LPR with a polarizer 50, a signal is produced after demodulation of the linear polarized and intensity modulated waves with a photo diode 10, said signal having the frequency of the alternating magnetic field provided by the coil 7. The output signal of the photo diode 10 is amplified in a selective amplifier 11 and fed to a phase sensitive demodulator circuit. In this circuit the signal is compared in amplitude and phase with the control signal of the oscillator 9, whereby a DC voltage independent of the laser frequency is produced. The DC voltage for a laser frequency $v_L < v_o$ and for a laser frequency $V_L > v_o$ differs in polarity. This DC voltage which is independent of laser frequency is fed by way of a low pass filter 13 and a DC voltage amplifier 14 to the piezo-ceramic 4 in the laser resonator for correction of the mirror position, in order to thereby stabilize the laser frequency. The change of the resonator length of the laser thereby causes shifts in the laser frequency in the direction of the central frequency $v_o$.

In order to generate the waves RZP and LZP, the laser tube 1 is located in a coil 7 which forms the inductance of an electrical oscillation circuit operated by a resonance amplifier 8. The resonance amplifier 8 is in turn operated in a similar manner by an oscillator 9. A housing 60 is provided to envelope the laser arrangement and bounce the piezo-ceramic 4 and the mirror 2.

Figure 3:
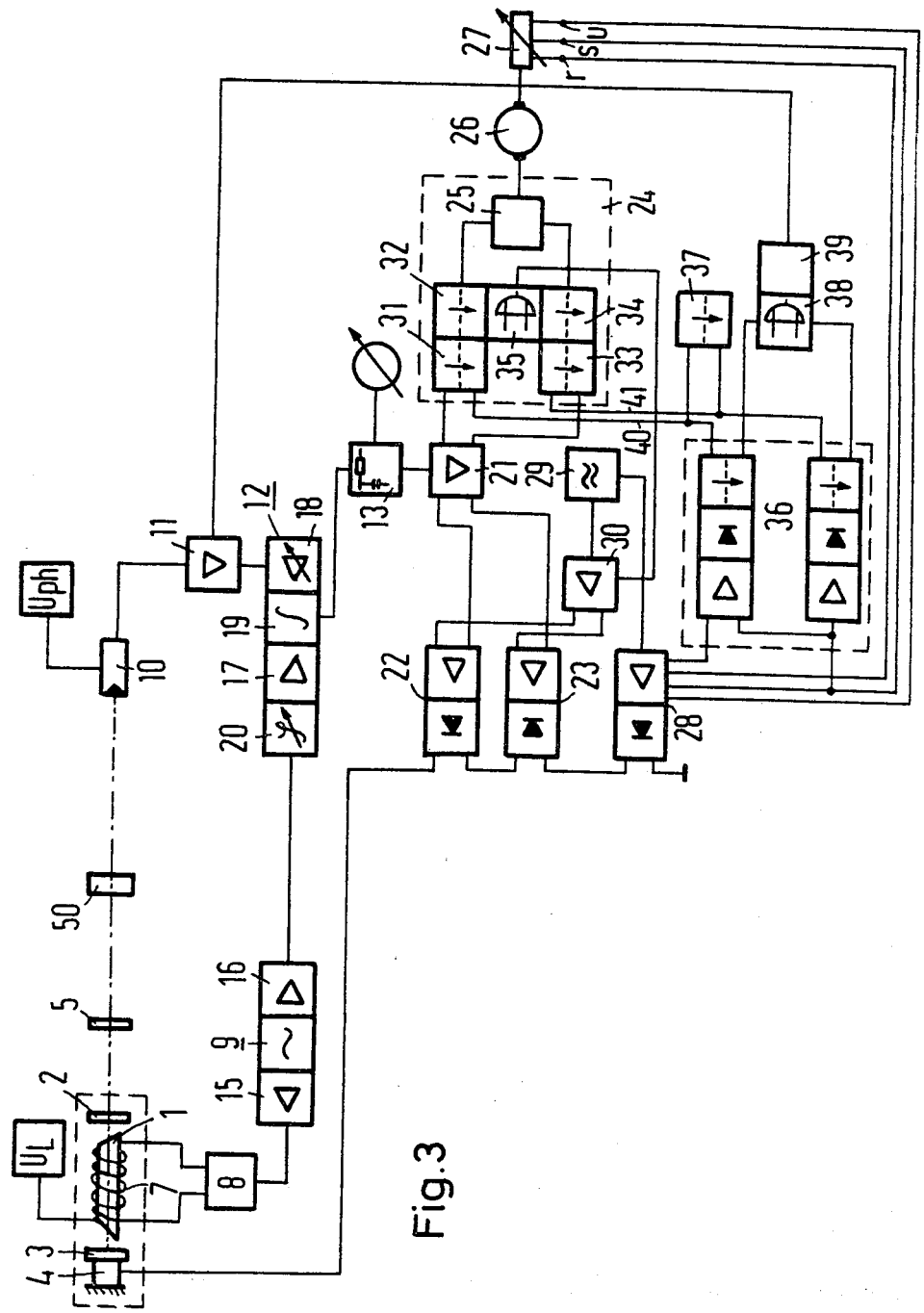
FIG. 3 is a schematic diagram of a frequency-stabilized laser arrangement according to the invention particularly illustrating automatic search and return of the potentiometer.

FIG. 3 schematically represents the design of a laser stabilization circuit according to the invention, which circuit comprises automatic search and return of a potentiometer 27. With the exception of the DC voltage amplifier 14 the parts corresponding to the parts of FIG. 2 have been identified with the same reference characters. The apparatus of FIG. 3 includes, in addition to additional amplifiers 15, 16 and 17, a phase correction member 20 which has been inserted between the oscillator 9 and the demodulator circuit 19 which compensates the phase shiftings produced in the amplifiers. Depending on whether the laser frequency to be synchronized is larger or smaller than the central frequency $v_o$, a positive or negative DC voltage is produced in one of the two outputs of an amplifier 21 causing in each case at the output of one of the amplifiers 22 and 23 a positive or negative DC voltage for controlling the piezo-ceramic 4. If the absolute amount of the output voltage of the amplifier 21 exceeds a certain value, the logic circuit 24 responds and, depending on the polarity of the voltage, the logic circuit 24 controls a motor switch 25, so that a motor 26 rotates either forward or reverse, thereby opening or closing a helipot 27. Therefore, a more or less large DC voltage is produced at the output of a DC voltage amplifier 28, fed by an oscillator 29, said voltage shifting the mirror 3 connected to the piezo-crystal 4 until the resonance frequency of the laser resonator approximately corresponds to the frequency $v_o$. During this process, the DC voltage amplifiers 22 and 23 are blocked by the amplifier 30 which is also operated by the oscillator 29, and controlled in turn by an OR switch 35 which responds to the voltages of the trigger circuits 31, 32, 33 and 34. The motor search circuit operates until the laser frequency has approximated the central frequency $v_o$ so closely that the output voltage of the amplifier 21 has dropped below the tear-off voltages of the trigger circuits 31 and 34 of the logic circuit 24. A second logic circuit 36 is connected to the sliding contact and one of the terminal tappings of the helipot 27 and is used to reset the sliding contact to the central portion as the contact approaches one of the end stops.

The response of the second circuit 36 signals, on the one hand, to the outside of the equipment by means of a signaling device controlled by a trigger circuit 37 (a buzzer or a lamp, for example), and on the other hand, the photo element voltage amplifier is blocked by way of an OR circuit 38 and a subsequent transistor switch 39. Since the return of the helipot 27 into its central position is also brought about by way of conductors 40 and 41 with the help of the first logic circuit 24, the amplifier 30 is again blocked.

While I have described my invention by reference to certain specific illustrated embodiments thereof, many changes and modifications of the invention may be made by those skilled in the art without departing from the spirit and scope thereof, and it is to be understood that I intend to include within the patent warranted hereon all such changes and modifications as may reasonably and properly be included within the scope of my contribution to the art.

What I claim is:

1. In a laser arrangement for stabilizing the frequency of a gas laser, particularly a short He-Ne laser, wherein the stimulated medium is positioned between a partially transparent fixed mirror and a displaceable mirror mounted on a piezo-ceramic and displaceable in the axial direction of the laser, wherein the laser beams discharging from the partially transparent fixed mirror are utilized to generate a DC control signal proportional to the frequency deviation of the laser beams with respect to the central frequency $v_o$ of the amplifying transfer, the control signal being utilized to return the resonator to the central frequency $v_o$ via the piezo-ceramic, the improvement therein comprising a coil disposed about the laser and energizable to generate an axis-parallel alternating magnetic field, a λ/4 plate and a polarization device disposed to receive laser beams from the partially transparent fixed mirror, a photo-sensitive element for receiving polarized laser beams from said polarization device and responsive thereto to produce an output signal for controlling the energization of said coil.

2. In a laser arrangement according to claim 1, comprising a resonance amplifier which includes said coil as the inductance thereof.

3. In a laser arrangement according to claim 1, further comprising a potentiometer, an electric motor for operating said potentiometer, a logic circuit for operating said motor in accordance with the signal produced by said photo-sensitive element, said potentiometer being connected in circuit with said piezo-ceramic to provide an additional DC voltage thereto when the laser frequency is outside of the control range of the photo-sensitive element control circuit.

4. In a laser arrangement according to claim 3, comprising demodulation means connected between said photo-sensitive element and said logic circuit, said logic circuit being operable to insure that the photo-element voltage has been demodulated correctly at phase.

5. In a laser arrangement according to claim 3, comprising means for disconnecting the circuit of said photo-sensitive element during a search operation.

6. In a laser arrangement according to claim 3, comprising a second logic circuit connected between said potentiometer and said first logic circuit and operable to effect a return of the potentiometer toward a central position prior to adjustment of the potentiometer to a predetermined limit.

7. In a laser arrangement according to claim 6, wherein said second logic circuit includes means for inhibiting said first logic circuit during the return movement of said potentiometer, and comprising means for rendering the output of said photo-sensitive means ineffective during the return movement of said potentiometer.

* * * * *